United States Patent
Yale et al.

[15] 3,676,445
[45] July 11, 1972

[54] 1,2-DIHYDROQUINOBENZOXA(OR THIA)ZEPINE DERIVATIVES

[72] Inventors: Harry Louis Yale; Ramesh Petigara, both of New Brunswick, N.J.

[73] Assignee: E. R. Squibb & Sons, Inc., New York, N.Y.

[22] Filed: Oct. 27, 1970

[21] Appl. No.: 84,533

[52] U.S. Cl. .................. 260/288 R, 260/283 R, 260/283 S, 260/283 SY, 260/289 R, 424/244, 424/258
[51] Int. Cl. ............................................ C07d 87/54
[58] Field of Search .......... 260/283 R, 283 S, 283 SY, 288 R, 260/289 R

[56] References Cited

UNITED STATES PATENTS 2,919,271  12/1959  Craig et al. ..................... 260/283 SY Primary Examiner—Henry B. Jiles
Assistant Examiner—Robert T. Bond
Attorney—Lawrence S. Levinson, Merle J. Smith, Donald J. Perrella and Burton Rodney

[57] ABSTRACT

1,2-Dihydroquinobenzoxa(or thia)zepine derivatives are provided having the structures

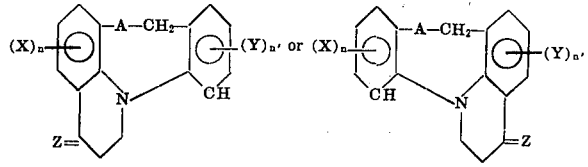

wherein Z is O, or N—OH, A is O, S, SO or $SO_2$ and X, Y, $n$ and $n'$ are as defined hereinafter. These compounds are useful as antifungal agents and antibacterial agents.

14 Claims, No Drawings

1,2-DIHYDROQUINOBENZOXA(OR THIA)ZEPINE DERIVATIVES

The present invention relates to 1,2-dihydroquinobenzoxa(or thia)zepine derivatives of the structure

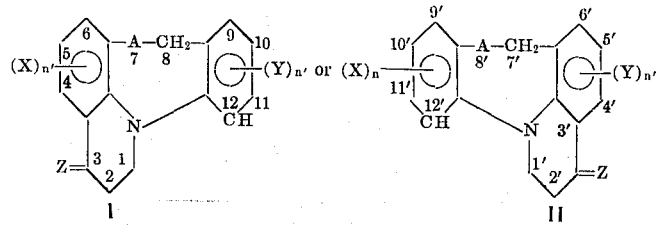

wherein X and Y are the same or different and can be halogen, trifluoromethyl, lower alkyl, lower alkylmercapto, lower alkyloxy, cyano, or di-lower alkysulfamoyl, A is O, S, SO or $SO_2$, Z is O or =N—OH, $n$ is 0, 1 or 2 and $n'$ is 0, 1 or 2.

The term "lower alkyl" as employed herein includes both straight and branched chain radicals of up to and including eight carbon atoms, for instance, methyl, ethyl, propyl, isopropyl, butyl, s-butyl, isobutyl, pentyl, hexyl, isohexyl, heptyl, 4,4-dimethylpentyl, octyl, 2,2,4-trimethylpentyl and the like. The lower alkyl group can include substituents such as aryl.

The term "halogen" includes F, Cl, Br or I.

The lower alkylmercapto groups contain up to eight carbon atoms and include methylmercapto, ethylmercapto, propylmercapto and mercapto radicals containing any of the lower alkyl groups mentioned hereinbefore.

The terms "lower alkyloxy" and "lower alkoxy" are interchangeable and refer to groups containing up to eight carbon atoms and which include any of the lower alkyl groups mentioned hereinbefore attached to a oxygen atom.

In the above Formulas I and II, each of the carbocyclic aromatic rings can include 0, 1 or 2 substituents, other than hydrogen. The nature and position of the substituents in the starting materials will determine which isomer, Type I and/or Type II, is obtained.

As will be seen hereinafter, the compounds of the invention are prepared from starting materials of the structure

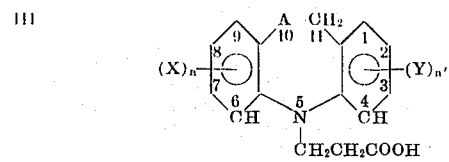

Where in the starting material III, $n$ is 1 or 2 and X includes strongly electronegative group like trifluoromethyl, cyano or di-lower alkylsulfamoyl substituent at the 7-position, and $n'$ is 0 or Y is a substituent at a position other than 3 in the starting material, cyclization is directed to the 4-position so that the Type II isomer is subsequently formed. However, where X is an ortho-para orienting group like halogen, especially chlorine, and $n$ is 1 or 2 and at least one halogen is at the 7-position of starting material III, or Y is lower alkyl, lower alkyloxy, or lower alkylmercapto at any position or a strongly electronegative group at a position other than 3 and $n'$ is 0, a mixture of the Type I and Type II isomers is obtained.

Where in the starting material III, $n'$ is 1 or 2 and Y includes a strongly electronegative group like trifluoromethyl, cyano or di-lower alkylsulfamoyl at the 3-position, and $n$ is 0 or X is a substituent at a position other than 7 in the starting material, cyclization is directed to the 6-position so that the Type I isomer is subsequently formed.

Where in the starting material III, $n'$ is 1 or 2 and Y includes an ortho-para orienting substituent at the 3-position, and $n$ is 0 or X is a substituent at a position other than in the starting material, cyclization is directed to the 6-position so that the Type I isomer is subsequently formed.

Where $n$ and $n'$ are 0, that is where there are no substituents on either aromatic ring, the Type I isomer is obtained, that is IV 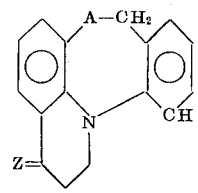

Where the starting material does not include substituents at the 3 and/or 7 positions, but does include substituents such as lower alkyl, lower alkyloxy, or lower alkylmercapto at the 1, 2, 8 and/or 9 positions, the Type I isomer is obtained.

Where the starting material does not include substituents as the 3 and/or 7 positions, but does include strongly electronegative groups at the 1 and/or 9 positions, the Type I isomer is obtained. However, where the starting material unsubstituted at the 3 and/or 7 positions includes a strongly electronegative group at the 2 and/or 8 positions, then a mixture of the Type I and Type II isomers is obtained.

Where X represents a strongly electronegative group like trifluoromethyl, cyano or di-lower alkylsulfamoyl and $n$ is 1 or 2 at least one X being at the 7-position of the starting material and Y is lower alkyl, lower alkyloxy or lower alkylmercapto at any position or any of the above strongly electronegative groups at a position other than 3 in the starting material and $n$ is 0, 1 or 2, the Type II isomer is obtained.

Where X is lower alkyl, lower alkyloxy, or lower alkylmercapto and $n$ is 1 or 2 and Y is halogen, trifluoromethyl, cyano or di-lower alkylsulfamoyl, and $n'$ is 1 or 2 at least one Y being at the 3-position of the starting material, the Type I isomer is obtained. In this case, X can be trifluoromethyl or other strongly electronegative group so long as it is not in the 7-position of the starting material as will be seen hereinafter.

Where X is lower alkyl, lower alkyloxy, or lower alkylmercapto, and $n$ is 1 or 2 and $n'$ in $(Y)_{n'}$ is 0, the Type I isomer is obtained.

Where Y is lower alkyl, lower alkyloxy, or lower alkylmercapto and $n'$ is 1 or 2 and the $n$ in $(X)_n$ is 0, the Type II isomer is obtained.

Where both X and Y represent lower alkyl, lower alkoxy and/or lower alkylmercapto, at least one of said groups being at the 3 and 7 positions of the starting material, the Type I isomer is obtained.

Preferred are those compounds of Formula I wherein $n=0$ and $n'=0$ and A=O and Z is =O or =N—OH; those compounds of Formula I wherein $n=0$, $n'=1$ and Y is Cl at the 11-position and Z=O or =N—OH and those compounds of Formula II wherein $n=1$, X is $CF_3$ at the 4-position, $n'=0$, A=O and Z is =O or =N—OH.

Examples of compounds falling within the present invention include, but are not limited to, the following. The symbol A in the formulas below represents —O—, —S—, —SO— and —$SO_2$—; each formula therefore, in essence, representing four species:

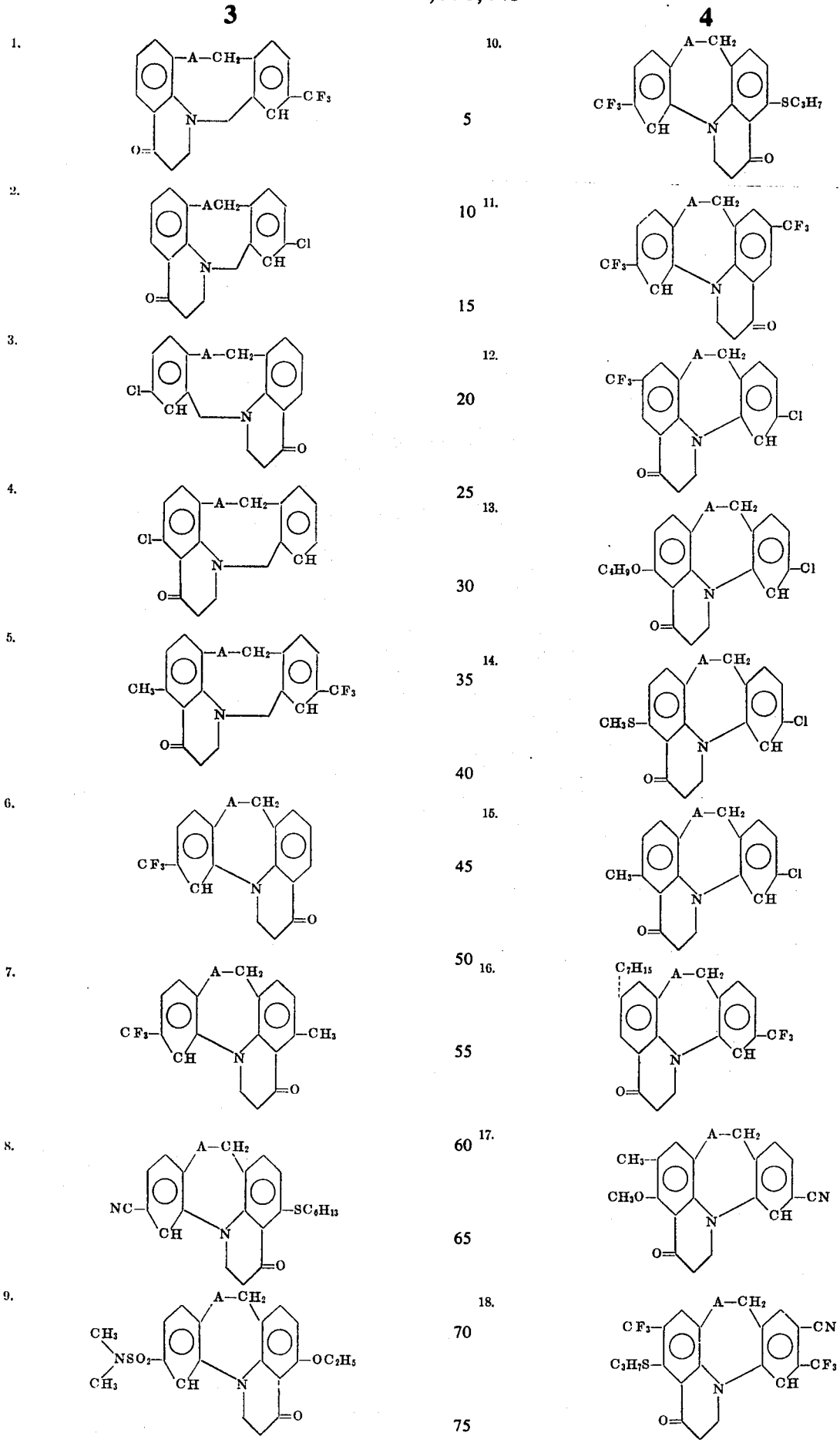

19. 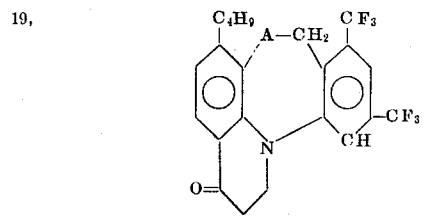
20. 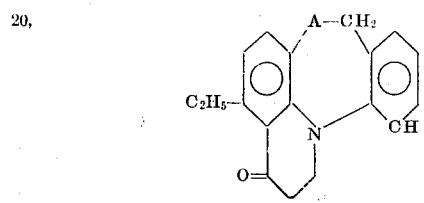
21. 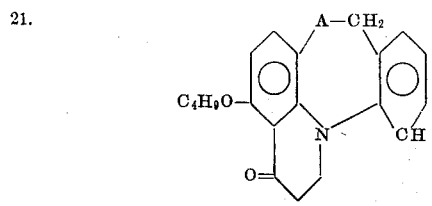
22. 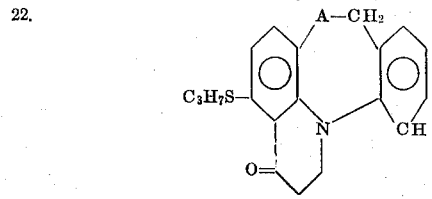
23. 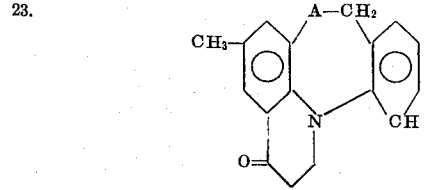
24. 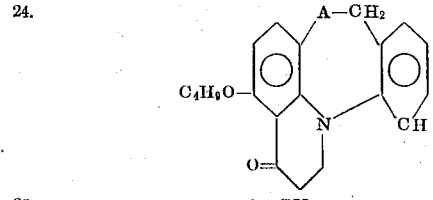
25. 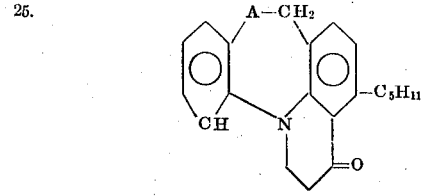
26. 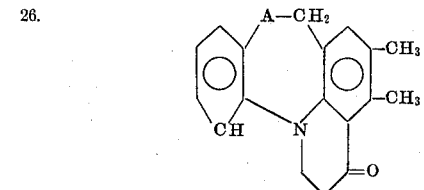
27. 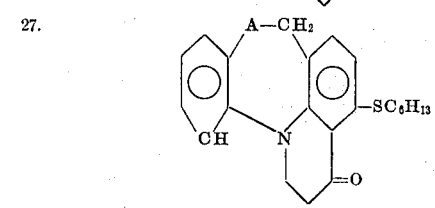
28. 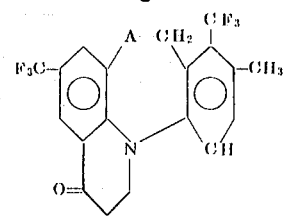
29. 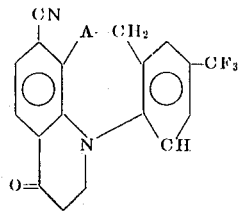
30. 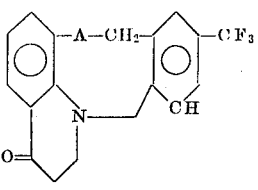
31. 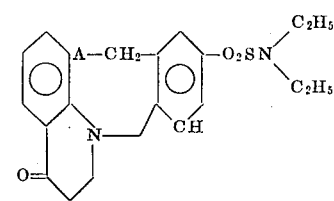
32. 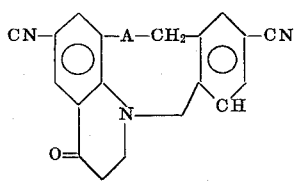
33. 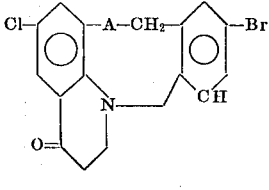
34. 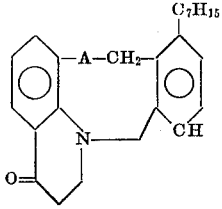
It is to be understood that each of the foregoing ketones can be converted to the corresponding oxime as described hereinafter.
The compounds of the Formulas I and/or II can be prepared by reacting a compound of the structure
V
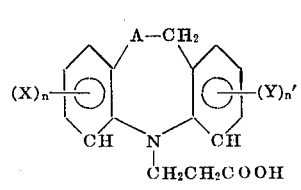

wherein X, Y, n, n', and A are as defined hereinbefore, with a phosphorus pentahalide, such as phosphorus pentachloride, in a molar ratio of V:pentahalide of within the range of from about 0.9:1 to about 1:1, in the absence of oxygen, and in the presence of an inert solvent, such as benzene, toluene, xylene, pentane, hexane, etc., at a temperature within the range of from about 0° to about 10° C, to form an acyl halide of the structure VI
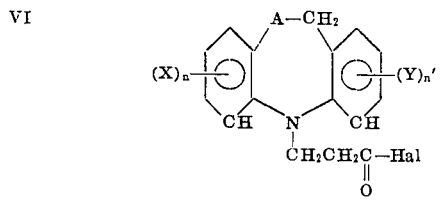

The acyl halide VI is reacted with anhydrous stannic chloride in a molar ratio of acyl halide VI:stannic chloride within the range of from about 0.4:1 to about 0.5:1, at a temperature within the range of from about 20° to about 30° C. to form the Formula VII and/or VIII compounds depending upon the nature and the position of the X and Y substituents.

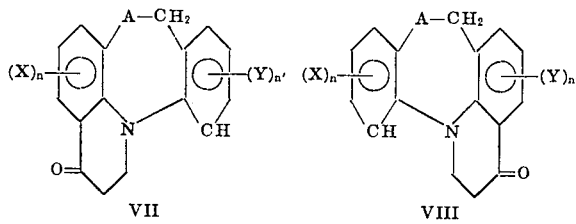

VII                  VIII

The compounds of Formulas VII and/or VIII can also be prepared by reacting the starting material.

IX
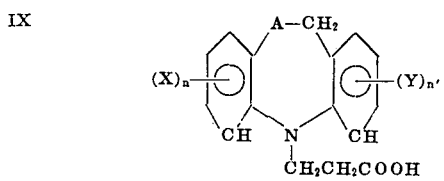

with trifluoroacetic anhydride, polyphosphoric acid or phosphorus pentoxide, in a molar ratio of IX: trifluoroacetic anhydride or polyphosphoric acid, or phosphorus pentoxide of within the range of from about 0.9:1 to about 1:1, in the presence of an inert solvent such as benzene, toluene, xylene, pentane, hexane, etc., at a temperature within the range of from about 10° to about 80° C.

The ketones of Formulas VII and VIII react with hydroxylamine or the hydrohalide salt thereof in the presence of a solvent such as ethanol, methanol, etc. to give the corresponding oximes, that is

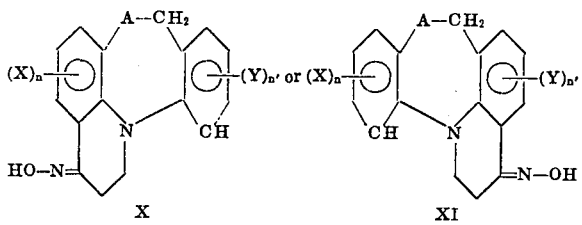

X                  XI

Compounds of the structure I and II wherein A is SO or $SO_2$ can be prepared as follows:

Compounds of the structures I or II wherein A is S are treated with an oxidizing agent like $H_2O_2$ in an alcohol solvent or perbenzoic acid or m-chloroperbenzoic acid in a solvent like chloroform to give sulfoxide of the structures XII or XIII

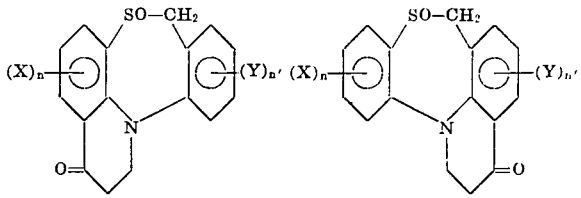

XII                  XIII

Compounds of Formulas I and II wherein A is $SO_2$ can be formed by treating I or II (wherein A is S) with an oxidizing agent like $H_2O_2$ in formic or acetic acid to give sulfones of the structures XIV and XV, respectively

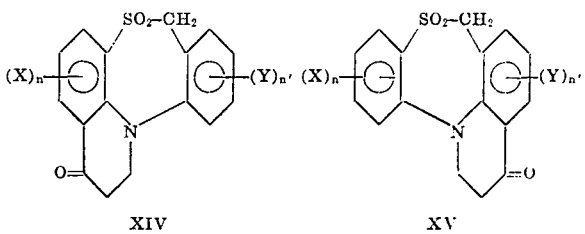

XIV                  XV

In addition, sulfoxides of the structures XII or XIII can be treated with hydrogen peroxide in formic or acetic acid to obtain sulfones of the structures XIV or XV.

The starting materials of Formula IX are prepared by several methods. One method comprises reacting compounds having the formula XVI:

XVI
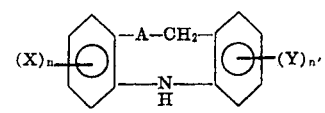

with acrylonitrile to yield compounds of formula XVII

XVII
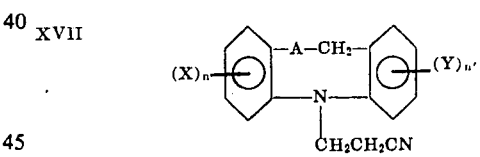

wherein n, n', X, Y and A are as defined herein.

This reaction is carried out by employing an excess of the acrylonitrile as the solvent. The temperature utilized in the reaction can be varied from about 0° to about 100° C. with the preferred range being between about 0° and about 75° C. This reaction proceeds expeditiously when a small amount (up to about 1 percent) of a strong base like sodium hydroxide, sodium methoxide, potassium t-butoxide, or benzyl trimethylammonium hydroxide (Triton B) is used as the catalyst.

Compounds with the nitrile structure XVII are converted to the carboxylic acid of formula IX by heating at reflux temperatures with sufficient aqueous or alcoholic alkali metal hydroxide, e.g., sodium hydroxide or potassium hydroxide in methanol or ethanol.

Another procedure for preparing compounds of formula IX is to treat the compounds of structure XVII with alcoholic hydrogen halide, such as hydrogen chloride in methanol, ethanol, and so forth, at room temperature whereby esters of the structure XVIII are formed.

XVIII
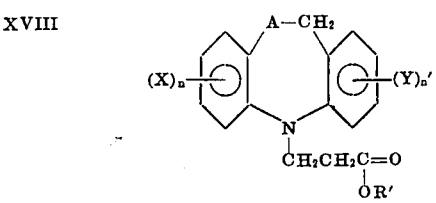

wherein R' is lower alkyl

By saponifying Compound XVIII with an alkali metal hydroxide, e.g., sodium hydroxide, lithium hydroxide, and so forth, the desired carboxylic acids of structure IX can be recovered.

Examples of compounds of Formula XVI where A is S are set out in U.S. Pat. Nos. 3,188,321 and 3,188,322.

Examples of compounds of Formula XVII where A is O or S can be found in a paper entitled Novel Polycyclic Heterocycles, by Yale et al, J. Med. Chem. 13, 713 (1970).

Examples of compounds of Formula XVI wherein A is SO or SO₂ can be found in the above mentioned paper by Yale et al.

Furthermore, compounds of Formula XVI wherein A is SO can be formed by heating a compound of the structure XIX 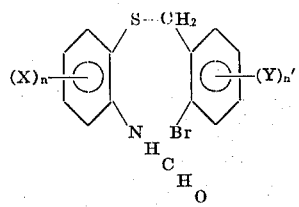

in the presence of potassium carbonate, Cu bronze, and a suitable solvent and treating the product with ether to form compounds of the structure XX 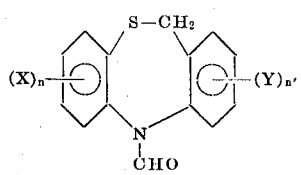

and treating compound XX with m-chloroperbenzoic acid in the presence of chloroform and then treating with ether to form a compound of the structure XXI XXI 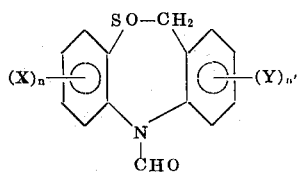

which can be treated with alcohol such as ethanol and base such as aqueous sodium hydroxide to form a compound of the structure XXII 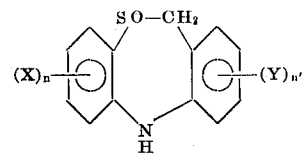

Compounds of Formula XVI wherein A is SO₂ can be formed by treating compounds of the structure XXIII 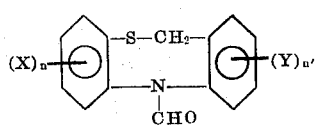

with an oxidizing agent such as hydrogen peroxide in the presence of formic acid to form a compound of the structure XXIV 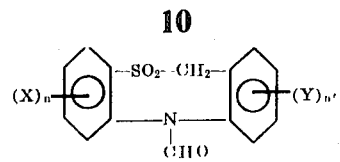

and treating XXIV with an alcohol such as ethanol and base such as aqueous sodium hydroxide to form a compound of the structure XXV 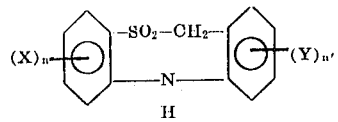

Examples of starting materials which can be employed in preparing the compounds of the invention include, but are not limited to, the following wherein A can be O, S, SO or SO₂.

1. 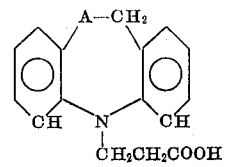

2. 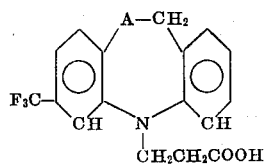

3. 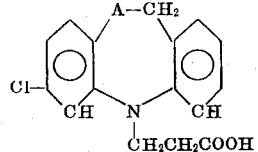

4. 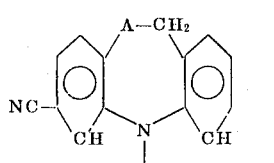

5. 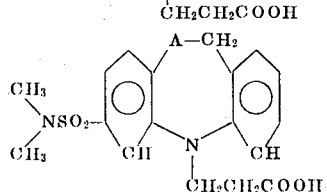

6. 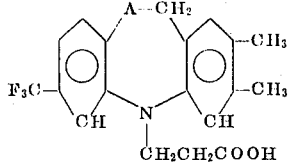

7. 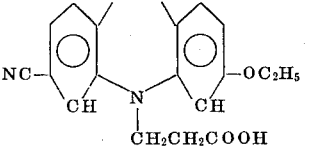

8. 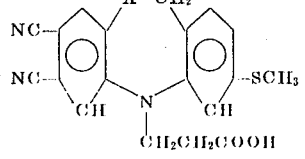

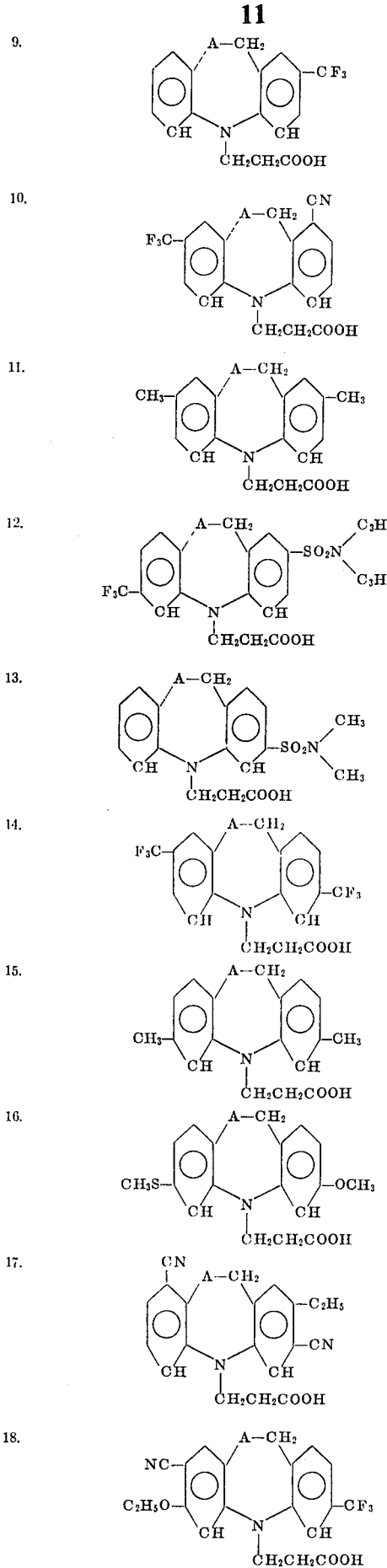

The above starting materials can be employed in the form of their corresponding salts as will be apparent to one skilled in the art.

The new compounds of Formulas I and II are useful as antimicrobial agents and may be used to combat infections in animal species, such as mice, rats, dogs, guinea pigs and the like, due to organisms such as *Trichomonas vaginalis*, *Trichomonas foetus*, *Staphyloccocus aureus*, *Salmonella schottmuelleri*, *Klebsiella pneumoniae*, *Proteus vulgaris*, *Escherichia coli*, *C. albicans* or *Trichophyton mentagrophytes*. For example, a compound or mixture of compounds of Formulas I and II may be administered orally to an infected animal, e.g., to a mouse, in an amount of about 5 to 25 mg. per kg. per day in 2 to 4 divided doses. These may be conventionally formulated in a tablet, capsule or elixir containing about 10 to 250 mg. per dosage unit, by compounding the active substance or substances with the conventional excipient, vehicle, binder, preservative, flavor, etc., as called for by accepted pharmaceutical practice. They may also be applied topically, e.g., to dermatophytosis in a guinea pig, in a lotion, salve or cream at a concentration of about 0.01 to 3 percent by weight.

They may also be used as surface disinfectants. About 0.01 to 1 percent by weight of any of these substances may be dispersed on an inert solid or in a liquid such as water and applied as a dust or spray. They may be incorporated also, for example, in a soap or other cleansing agent, e.g., a solid or liquid detergent, detergent composition, for example, in general cleaning, in cleaning dairy barns or equipment or cleaning food handling or processing equipment.

The following examples are illustrative of the invention. All temperatures are on the Centigrade scale.

EXAMPLE 1

1,2-Dihydro-3H,8H-quino[1,8-a,b][4,1]benzoxazepin-3-one
A. 5,11-Dihydrodibenz[b,e][1,4]oxazepine-5-propionic acid A suspension of 30.4 g of 5,11-dihydrodibenz[b,e]-[1,4]oxazepine in 90 ml of acrylonitrile is cooled to 0°–5°. To this is added with efficient stirring and cooling 0.9 ml of Triton B. The suspension becomes homogeneous and a red solution results with the rise of temperature to 10°. The reaction mixture is allowed to come to room temperature and then refluxed for one hour with stirring. The excess of acrylonitrile is removed by known means, water is added, and the solid is filtered. The solid is dried, powdered, and extracted with five 400 ml portions of diethyl ether. The diethyl ether extracts are dried and concentrated to a volume of 250 ml. The white crystalline compound is filtered. The filtrate is again concentrated and the resulting solid is filtered and found to melt at about 138°–139.5°, and is identified as 5,11-dihydrodibenz[b,e][1,4]oxazepine-5-propionitrile.

The 5,11-dihydrodibenz[b,e][1,4]oxazepine-5-propionitrile, 5.0 g, is dissolved in 200 ml of methanol and to this 2.24 g of potassium hydroxide dissolved in 20 ml of water is added. The solution is refluxed for 4 hours, and then is concentrated in vacuo. The residue is taken up in 600 ml of $H_2O$, the solution is cooled, and then acidified with 2 percent aqueous HCl. The solid is filtered and dissolved in 600 ml of $C_6H_6$. This solution is treated with Darco and then extracted with 600 ml of 2percent aqueous NaOH solution. The extracts are treated with Darco and Hyflo, filtered and the filtrate is acidified with 2 percent aqueous HCl. The solid is filtered and recrystallized from $C_6H_6$, and found to have a m.p. of about 203°–205°.

B. 1,2-Dihydro-3H,8H-quino[1,8-a,b][4,1]benzoxazepin-3-one

In a 500 ml flask equipped with stirring bar, thermometer, nitrogen inlet, dropping funnel and $CaCl_2$ guard tube, is suspended 10.8 g of 5,11-dihydrodibenz[b,e][1,4]oxazepine-5-propionic acid in 220 ml of $C_6H_6$. This is cooled to 10°, and to it is added a solution of 9.5 g of $PCl_5$ in 50 ml of benzene in 45 minutes. The reaction mixture is stirred for 1.5 hr. at room temperature. To the resulting solution, 5.5 g of sodium hydrosulfite is added and stirred for 15 minutes. The reaction mixture is filtered and the filtrate is concentrated in vacuo to yield a liquid residue. The residue is triturated with 70 ml of petroleum ether to give a yellow solid, which is filtered. Of the acid chloride residue (9.6 g), 8.6 g are dissolved immediately in 220 ml of benzene.

One gram of the above crude acid chloride is dissolved in 150 ml of boiling petroleum ether, filtered, the filtrate treated with 0.2 g of Darco, refluxed, and filtered again. This is stored overnight in the cold room. Crystallization does not occur. The solution is concentrated to 50 ml and cooled in an acetone-$CO_2$ bath, when a pale yellow solid separates. This is filtered and dried in vacuo for 15 minutes; it softens at 60° and melts with decomposition at 74°–75°.

The above solution of 8.6 g of the acid chloride in 220 ml of benzene is placed in a flask equipped with a stirrer, a dropping funnel, and a reflux condenser guarded with a $CaCl_2$ tube. To this, while stirring, is added dropwise, a solution of 9.0 ml of anhydrous $SnCl_4$ is 50 ml of benzene. A viscous red complex forms which turns to violet towards the end of the addition. The reaction mixture is stirred for 1 hour and then 600 ml of ether is added. To this, 20 ml of conc. HCl and 150 ml of distilled $H_2O$ are added and the mixture stirred vigorously for 1 hour. The organic phase is separated, washed, filtered, and solvent removed and the residue is extracted successively with 300, 200, and 200 ml portions of boiling cyclohexane. The combined cyclohexane extracts are concentrated to 75 ml to give 2.9 g of product, mp 116°–118°.

EXAMPLE 2

1,2-Dihydro-3H,7H-quino[8,1-c,d][1,5]benzoxazepin-3-one, oxime

A mixture of 1.25 g of 1,2-dihydro-3H,8H-quino[1,8-a,b][1,5]benzoxazepin-3-one and 0.7 g of $NH_2OH \cdot HCl$ is dissolved in 140 ml of hot 70 percent ethanol and refluxed for 6 hours; the reaction mixture is concentrated on the Rinco to 60 ml, when a yellow precipitate forms. After standing overnight in the cold room, a yellow solid forms which is filtered and dried to give 1.35 g of material; mp softens at 155°, and melts with decomposition at 170°. It is dissolved in 125 ml of refluxing 75 percent ethanol, treated with 0.2 g of Darco and filtered to give 1.2 g of product, mp 190°–192°.

EXAMPLE 3

11-Chloro-1,2-dihydro-3H,8H-quino[1,8-a,b][4,1]benzoxazepin-3-one

A. 3-Chloro-5,11-dihydrodibenz[b,e][1,4]oxazepine-5-propionic acid

A suspension of 24.4 g of 3-chloro-5,11-dihydrodibenz-[b,e][1,4]oxazepine in 55 ml of acrylonitrile is cooled to 0°–5°. To this is added with efficient stirring, and cooling, 0.3 ml of Triton B, pausing after each drop of addition. The temperature rises slowly from 3° to 14° and then rapidly to 45° within 5 minutes with the formation of red colored clear solution. The mixture is cooled to 5°–10°, stirred for 5 minutes, allowed to come to room temperature and then slowly heated to reflux temperature. After 1 hour heating under reflux, the excess of acrylonitrile is removed in vacuo. The residue is extracted with 3–350 ml portions of diethyl ether, the combined diethyl ether extracts are treated with 3.0 g of Darco and 1.0 g of Hyflo, filtered, the filtrate is dried, and concentrated to give 31.6 g of 3-chloro-5,11-dihydrodibenz[b,e][1,4]oxazepine-5-propionitrile, b.p. about 200°–210° (0.2 min.).

The 3-chloro-5,11-dihydrodibenz[b,e][1,4]oxazepine-5-propionitrile, 71.10 g, is dissolved in 1,200 ml of dry dioxane and to this 800 ml of 30 percent methanolic hydrogen chloride is added. The solution is stirred for 72 hours, 30 ml of $H_2O$ is added, the mixture is stirred for 0.5 hour, concentrated in vacuo to 400 ml, filtered, and the filtrate concentrated to dryness in vacuo. The residue solidifies on keeping to yield 3-chloro-5,11-dihydrodibenz[b,e][1,4]-oxazepine-5-propionic acid, methyl ester.

The 3-chloro-5,11-dihydrodibenz[b,e][1,4]oxazepine-5-propionic acid, methyl ester, 25.4 g, is dissolved in 2200 ml of MeOH and to this 5.6 g of KOH dissolved in 300 ml of $H_2O$ is added. The solution is refluxed for 4 hours, and then is concentrated in vacuo. The residue is taken up in 600 ml of $H_2O$, the solution is cooled, and then acidified with 2 percent aqueous HCl. The solid is filtered and dissolved in 600 ml of $C_6H_6$. This solution is treated with Darco and then extracted with 600 ml of 2 percent aqueous NaOH solution. The extracts are treated with Darco and Hyflo, filtered and the filtrate is acidified with 2 percent aqueous HCl. The solid is filtered and recrystallized from $C_6H_6$ to yield 3-chloro-5,11-dihydrodibenz[b,e][1,4]oxazepine-5-propionic acid (m.p. 138°–140°).

B. 11-Chloro-1,2-dihydro-3H,8H-quino[1,8-a,b][4,1]-benzoxazepin-3-one 3.7 g of 3-chloro-5,11-dihydro[b,e][1,4]oxazepine-5-propionic acid is dissolved in 20 ml of warm benzene and the resulting colorless solution is allowed to come to 30°, and to this, 1.9 ml (2.8 g) of $(CF_3CO)_2O$ is added dropwise. The reaction mixture is slowly heated to reflux, the reflux is maintained for 5 minutes, and the mixture is poured into 250 ml of cold water. To this, 150 ml of benzene is added, and stirred for a few minutes. The benzene layer is separated, washed, dried, filtered, and concentrated to dryness. The residue is recrystallized first from 2-propanol and then from cyclohexane to give 2.3 g of product, mp 142°–144°.

EXAMPLE 4

11-Chloro-1,2-dihydro-3H, 8H-quino[1,8-a,b][4,1]benzoxazepin-3-one,oxime

A solution of 1.1 g of the ketone from Example 3 and 0.54 g of hydroxylamine hydrochloride in 40 ml of 70 percent ethanol is refluxed for 4 hours, cooled and the solid filtered. The solid is recrystallized from 70 percent ethanol to give 800 mg of product, mp 158°–161° (dec.).

EXAMPLE 5

1,2-Dihydro-11-(trifluoromethyl)-3H,7H-quino[8,1-c,d][1,5]-benzoxazepin-3-one

A. 5,11-Dihydro-7-(trifluoromethyl)dibenz[b,e][1,4]-oxazepine-5-propionic acid

To 50.0 g of 5,11-dihydro-7-(trifluoromethyl)dibenz-[b,e][1,4]oxazepine in 60 ml of redistilled acrylonitrile is added in 5 minutes 0.80 ml of Triton B. Subsequently, the mixture is heated for one hour under reflux and the product isolated by extraction with benzene to give 5,11-dihydro-7-(trifluoromethyl)dibenz[b,e][1,4]oxazepine-5-propionitrile, m.p. about 161-163°.

7-(Trifluoromethyl)-5,11-dihydrodibenz[b,e][1,4]-oxazepine-5-propionitrile, 15.0 g, is dissolved in 240 ml of dry dioxane and to this 140 ml of 30 percent methanolic hydrogen chloride is added. The solution is stirred for 36 hours, 6 ml of $H_2O$ is added, stirred 0.5 hour, and then concentrated in vacuo to 120 ml. The solid is filtered, and the filtrate is concentrated to dryness in vacuo. The residual liquid is taken up in 200 ml of diethyl ether, treated with Darco and Hyflo, the diethyl ether solution is concentrated and the residue distilled in vacuo to give 5,11-dihydro-7-(trifluoromethyl)dibenz[b,e][1,4]-oxazepine-5-propionic acid, methyl ester, b.p. about 166°–168° )0.08 mm.), m.p. about 70.0°–71.5°.

7-(Trifluoromethyl)-5,11-dihydrodibenz[b,e][1,4]oxazepine-5-propionic acid, methyl ester, 3.15 g, is dissolved in 315 ml of methanol and to this 0.5 g of potassium hydroxide dissolved in 25 ml of water is added. The mixture is refluxed for 2.5 hours and then concentrated in vacuo. The residue is taken up in 250 ml of water and this solution is acidified with 2 percent aqueous HCl to give 5,11-dihydro-7-(trifluoromethyl)dibenz[b,e][1,4]oxazepine-5-propionic acid, m.p. about 94°–96°.

B. 1,2-Dihydro-11-(trifluoromethyl)-3H,7H-quino[8,1-c,d]-[1,5]-benzoxazepin-3-one A solution of 6.86 g of 5,11-dihydro-7-(trifluoromethyl) dibenz[b,e][1,4]oxazepine-5-propionic acid in 50 ml of benzene is cooled to 5°–10°. To this is added dropwise with stirring a solution of 4.6 g of PCl₅ in 25 ml of benzene over a period of 15 minutes. The solution is stirred at 25° for 40 minutes and then at 40°–50° for another 20 minutes. The reaction mixture is then heated at 55° for 10 minutes, cooled to 10° and to this is added dropwise with stirring a solution of 12.0 g anhydrous SnCl₄ in 20 ml of benzene. After stirring 20 minutes at 10° and 20 minutes at room temperature, 100 ml of ether are added, followed by 10 ml of concentrated hydrochloric acid, and then 100 ml of water. After stirring vigorously for 10 minutes, the organic phase is separated, and the aqueous phase is extracted with 100 ml of ether. The combined organic extracts are washed, dried, filtered, and concentrated to dryness to give 6.9 g of residue; this is crystallized from 2-propanol to give 4.3 g of product, mp 140°–142°.

EXAMPLE 6

1,2-Dihydro-11-(trifluoromethyl)-3H,7H-quino[8,1-cd][1,5]-benzoxazepin-3-one

To a solution of 64.0 g of 5,11-dihydro-7-(trifluoromethyl)dibenz[b,e][1,4]oxazepine-5-propionic acid in 300 ml of anhydrous benzene, is added dropwise 28.2 ml of (CF₃CO)₂O while stirring. The reaction mixture is slowly heated to reflux temperature and the reflux is maintained for 15 minutes. The solution is then poured into 2,600 ml of cold water and to this 600 ml of benzene is added while stirring. The benzene layer is separated and the aqueous phase is extracted once with 200 ml of benzene. The combined benzene extracts are washed, dried, and filtered. The solvent is removed under reduced pressure to give 62.0 g of yellow solid, which is crystallized twice from 2-propanol to give 50.5 g of a bright yellow crystalline product, mp 142°–143.5°. A mixture mp with the ketone obtained in Example 5 is 142°–143.5°.

EXAMPLE 7

1,2-Dihydro-11-(trifluoromethyl)-3H,7H-quino[8,1-c,d][1,5]-benzoxazepin-3-one, oxime A solution of 28.0 g of the ketone from Example 5, and 13.6 g of hydroxylamine hydrochloride in 600 ml of warm 70 percent ethanol is refluxed for 4 hours, and kept at room temperature to give a pale yellow crystalline solid. This is filtered and recrystallized from 70 percent ethanol to give 21.0 g of the product, mp 198°–200° (dec.).

EXAMPLE 8

11-Chloro-1,2-dihydro-3H,7H-quino[8,1-c,d][1,5]benzoxazepin-3-one and 4-chloro-1,2-dihydro-3H,8H-quino[1,8-a,b][4,1]-benzoxazepin-3-one A suspension of 17.4 g of 7-chloro-5,11-dihydrodibenz-[b,e][1,4]oxazepine in 35 ml of acrylonitrile is cooled to 0°–5°. To this is added with efficient stirring and cooling 0.2 ml of Triton B. The suspension becomes homogeneous and a red solution results with the rise of temperature to 10°. The reaction mixture is allowed to come to room temperature and then refluxed for one hour with stirring. The excess of acrylonitrile is removed by known means, water is added, and the solid is filtered. The solid is dried, powdered, and extracted with five 400 ml portions of diethyl ether. The diethyl ether extracts are dried and concentrated to a volume of 250 ml. The white crystalline compound is filtered. The filtrate is again concentrated and the resulting solid is filtered. The yield of the combined desired products (i.e. 7-chloro-5,11-dihydrodibenz[b,e]-[1,4]oxazepine-5-propionitrile) is 21.5 g, m.p. about 131°–132°.

The 7-chloro-5,11-dihydrodibenz[b,e][1,4]oxazepine-5-propionitrile, 71.10 g, is dissolved in 1,200 ml of dry dioxane and to this 800 ml of 30 percent methanolic hydrogen chloride is added. The solution is stirred for 72 hours, 30 ml of H₂O is added, the mixture is stirred for 0.5 hour, concentrated in vacuo to 400 ml, filtered, and the filtrate concentrated to dryness in vacuo. The residue solidifies on keeping to yield 7 - chloro-5,11-dihydrodibenz[b,e][1,4]-oxazepine-5-propionic acid, methyl ester 67.5 g, m.p. about 70°–72°.

The 7-chloro-5,11-dihydrodibenz[b,e][1,4]oxazepine-5-propionic acid, methyl ester, 25.4 g, is dissolved in 2200 ml of MeOH and to this 5.6 g of KOH dissolved in 300 ml of H₂O is added. The solution is refluxed for 4 hours, and then is concentrated in vacuo. The residue is taken up in 600 ml of H₂O, the solution is cooled, and then acidified with 2 percent aqueous HCl. The solid is filtered and dissolved in 600 ml of C₆H₆. This solution is treated with Darco and then extracted with 600 ml of 2 percent aqueous NaOH solution. The extracts are treated with Darco and Hyflo, filtered and the filtrate is acidified with 2 percent aqueous HCl. The solid is filtered and recrystallized from C₆H₆. The yield of 7-chloro-5,11-dihydrodibenz[b,e][1,4]oxazepine-5-propionic acid is 23.0 g m.p. about 155.0°–156.5°

A solution of 7.35 g of 7-chloro-5,11-dihydrodibenz-[b,e][1,4]oxazepine-5-propionic acid in 40 ml of warm benzene is slowly cooled to 35° and while stirring 3.8 ml of (CF₃CO)₂O is added dropwise. The reaction mixture is heated to reflux and the reflux is maintained for 5 minutes. To this 50 ml of benzene is added and the solution is poured into cold water. The yellow benzene layer is separated and the aqueous phase is extracted with 50 ml of benzene. The combined benzene extracts are washed, dried, and concentrated to dryness under reduced pressure. The residue solidifies to an intense yellow material, which weighs 7.0 g, mp 110°–120°. This solid is dissolved in 325 ml of a refluxing mixture of 2-propanol and cyclohexane (2:3), and kept at room temperature for two days, when two different kinds of crystals form. These are filtered and the intense yellow transparent rhombic crystals (compound A) are separated manually from the darker yellow flat needles (compound B). Compound A melts at 140°–142° and weighs 1.3 g while compound B melts at 137°–143° and weighs 3.4 g.

Compound A, 1.3 g is dissolved in 75 ml of a refluxing mixture of 2-propanol and cyclohexane (1:4), filtered, and kept at room temperature. This gives 1.1 g of intense yellow transparent needles mp 140°–142.5°. This compound is shown to be 11-chloro-1,2-dihydro-3H, 7H-quino[8,1-c,d][1,5]benzoxazepin-3-one.

Compound B is dissolved in 225 ml of a refluxing mixture of 2-propanol and cyclohexane (1:4), filtered, and kept at room temperature to give 2.7 g of darker yellow non-transparent long needles, mp 141.5°–144°. This compound is shown to be 4-chloro-1,2-dihydro-3H, 8H[1,8-a,b][4,1]benzoxazepin-3-one.

A mixture mp of Compound A and Compound B is 115°–122°.

EXAMPLE 9

11-Chloro-1,2-dihydro-3H,7H-quino[8,1-c,d][1,5]benzoxazepin'-3-one,oxime

A mixture of 360 mg of 11-chloro-1,2-dihydro-3H, 7H-quino[8,1-c,d][1,5]benzoxazepine-3-one from Example 8, and 175 mg of hydroxylamine hydrochloride is dissolved in 20 ml of warm 70 percent ethanol and refluxed for 3 hours. The reaction mixture is concentrated to 15 ml and allowed to cool. The resulting pale yellow needles are filtered and recrystallized from 70 percent ethanol to give 285 mg of product, mp 224°–226° (dec.).

EXAMPLE 10

4-Chloro-1,2-dihydro-3H,8H-quino[1,8-a,b][4,1]benzoxazepin-3-one,oxime

A mixture of 1.3 g of 4-chloro-1,2-dihydro-3H,8H-quino[1,8-a,b][4,1]benzoxazepin-3-one from Example 8, and 0.63 g of hydroxylamine hydrochloride in 140 ml of warm 70 percent ethanol is refluxed for three hours. The reaction mixture is allowed to cool. The resulting pale yellow needles are filtered and recrystallized from 80 percent ethanol to give 1.1 g of product, mp 252°–254° (dec.).

EXAMPLE 11

1,2-Dihydro-11-(trifluoromethyl)-3H,7H-quino[8,1-c,d][1,5]-benzthiazepin-3-one,8-oxide To a solution of 3.35 g of 1,2-dihydro-11-(trifluoromethyl)3H,7H-quino[8,1-c,d][1,5]benzthiazepin-3-one in 40 ml of $CHCl_3$ is added 1.8 g of m-chloroperbenzoic acid, and the mixture refluxed for 7 hours, cooled, and washed with 5% aqueous $Na_2CO_3$ solution, followed by water, dried, and filtered. Removal of solvent gives 3.4 g of residue, which is crystallized from cyclohexane to give 1.8 g of product, mp 155°–157°.

EXAMPLE 12

1,2-Dihydro-11-(trifluoromethyl)-3H,7H-quino[8,1-c,d][1,5]-benzthiazepine-3-one,8,8-dioxide To a suspension of 3.35 g of 1,2-dihydro-11-(trifluoromethyl)-3H,7H-quino[8,1-c,d][1,5]benzthiazepin-3-one in 15 ml of 98–100 percent formic acid is added dropwise 5 ml of 30% $H_2O_2$, while stirring at 60°. The reaction mixture is heated at 60° for 4 hours, and concentrated to dryness in vacuo. The residue is crystallized from toluene to give 2.3 g of product, mp 189°–191°.

This compound is also obtained from the sulphoxide obtained in Example 11, by the action of $H_2O_2$–$HCOO_2H$ as described in Example 12.

EXAMPLES 13 to 36

Employing the procedure described in Example 1, but substituting the starting material shown in the left hand column of Table I below, the product shown in the right hand column is obtained.

TABLE 1

| Example No. | Starting material | Product |
|---|---|---|
| 13 | (structure) | (structure) |
| 14 | (structure) | (structure) |
| 15 | (structure) | (structure) |
| 16 | (structure) | (structure) |
| 17 | (structure) | (structure) |

Table I—Continued
| Example No. | Starting material | Product |
|---|---|---|
| 18 | 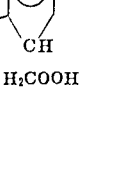 | 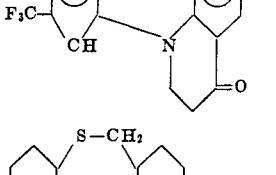 |
| 19 | 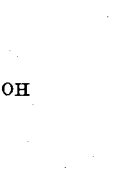 | 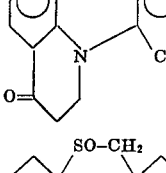 |
| 20 | 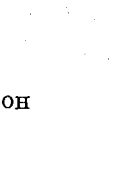 | 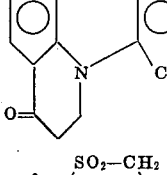 |
| 21 | 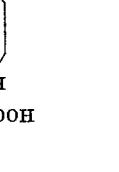 | 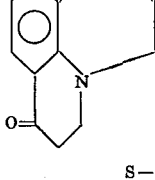 |
| 22 | 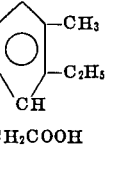 | 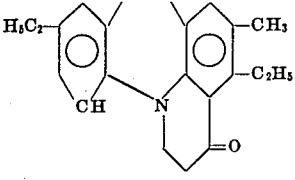 |
| 23 | 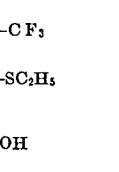 | 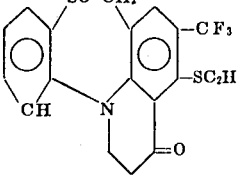 |
| 24 | 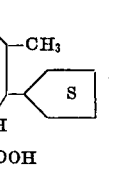 | 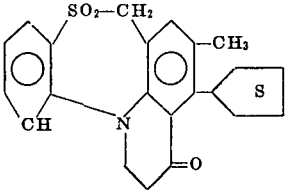 |
| 25 | 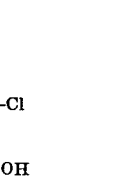 | 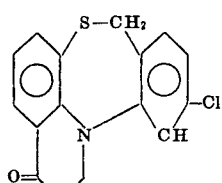 |

Table I—Continued

| Example No. | Starting material | Product |
|---|---|---|
| 26 | (structure) | (structure) |
| 27 | (structure) | (structure) |
| 28 | (structure) | (structure) + (structure) |
| 29 | (structure) | (structure) |
| 30 | (structure) | (structure) |
| 31 | (structure) | (structure) |
| 32 | (structure) | (structure) |

Table I — Continued

| Example No. | Starting material | Product |
|---|---|---|
| 33 | 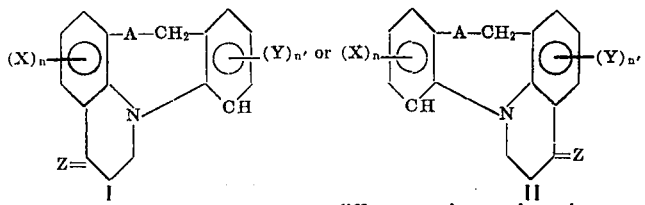 | |
| 34 | | |
| 35 | | |
| 36 | | |

EXAMPLES 37 to 62

The corresponding oximes of the compounds of Examples 11 to 36 can be prepared by reacting the compounds of Examples 11 to 36 with hydroxylamine hydrochloride in accordance with the procedure of Example 2.

EXAMPLES 63 to 84

Employing the procedure of Example 3, using the starting material of Examples 13 to 36 the product shown in the right hand column of Table I is obtained.

Furthermore, in Examples 3 and 63 to 84, the trifluoroacetic anhydride can be replaced with polyphosphoric acid/or phosphorus pentoxide to form the products of Examples 63 to 84.

What is claimed is:

1. A compound of the structure wherein X and Y are the same or different and are selected from the group consisting of lower alkyl, lower alkylmercapto, lower alkoxy, halogen, trifluoromethyl, cyano or di-lower alkylsulfamoyl, A is selected from the group consisting of O, S, SO or $SO_2$, Z is O or =N—OH, $n$ is 0, 1, or 2 and $n'$ is 0, 1 or 2, or salts thereof.

2. A compound in accordance with claim 1 wherein A is O.
3. A compound in accordance with claim 1 wherein A is S.
4. A compound in accordance with claim 1 wherein A is O and Z is O.
5. A compound in accordance with claim 1 wherein A is O and Z is =N—OH.
6. A compound in accordance with claim 1 having the formula

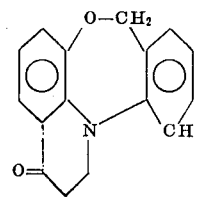

7. A compound in accordance with claim 1 having the formula

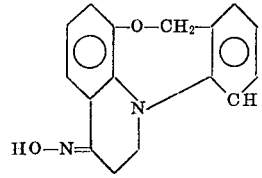

8. A compound in accordance with claim 1 having the formula

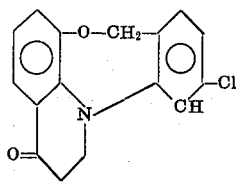

9. A compound in accordance with claim 1 having the formula

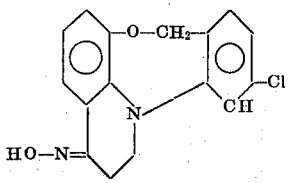

10. A compound in accordance with claim 1 having the formula

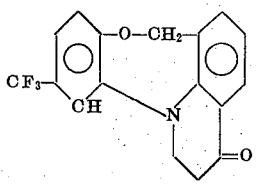

11. A compound in accordance with claim 1 having the formula

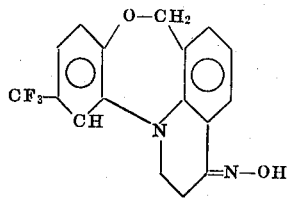

12. A compound in accordance with claim 1 comprising a mixture of compounds having the formulas

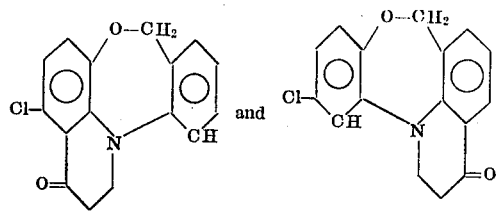

13. A compound in accordance with claim 1 having the formula

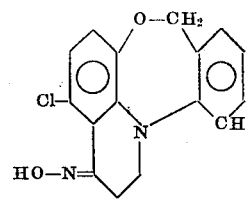

14. A compound in accordance with claim 1 having the formula

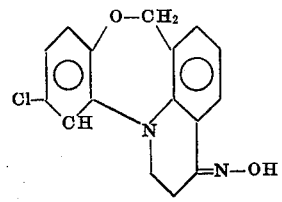

* * * * *

UNITED STATES PATENT OFFICE
CERTIFICATE OF CORRECTION

Patent No. 3,676,445　　　　　　　　　Dated July 11, 1972

Inventor(s) Harry Louis Yale; Ramesh Petigara

It is certified that error appears in the above-identified patent and that said Letters Patent are hereby corrected as shown below:

Column 2, line 1, "other than in the starting" should read --other than 7 in the starting--. Column 2, line 69 "at the 4-position" should read --at the 11'-position--.
Column 6, structure 30:

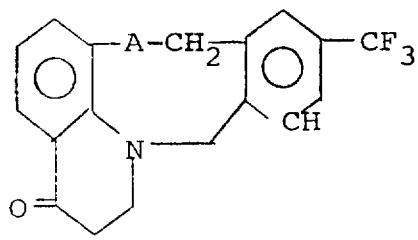　　　should read　　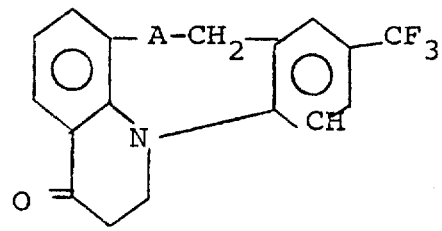

Column 17, example no. 17:

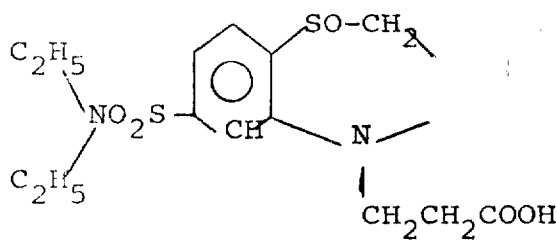　　should read　　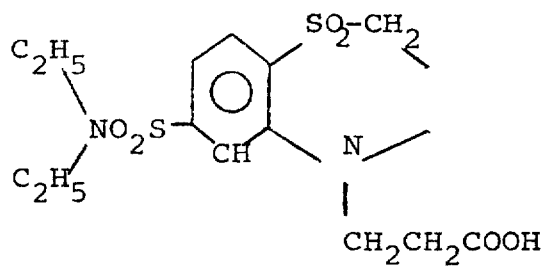

UNITED STATES PATENT OFFICE
CERTIFICATE OF CORRECTION

Patent No. 3,676,445            Dated July 11, 1972

Inventor(s) Harry Louis Yale; Ramesh Petigara

It is certified that error appears in the above-identified patent and that said Letters Patent are hereby corrected as shown below:

Column 18, structure 17:

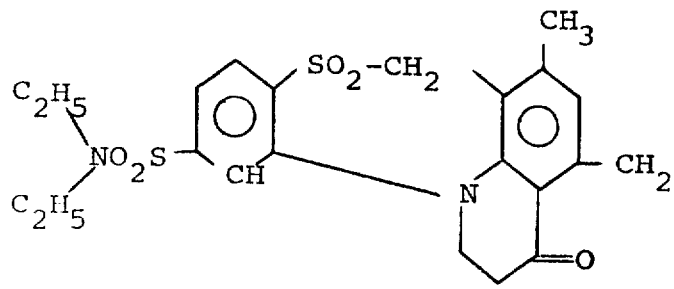

should read

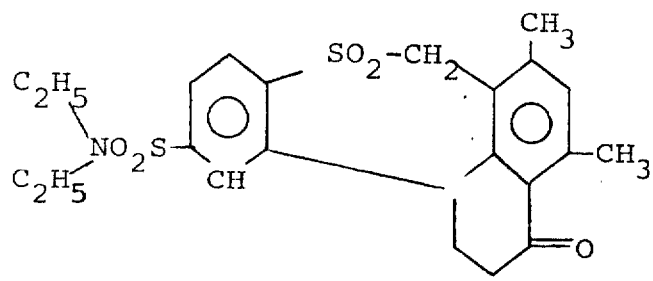

UNITED STATES PATENT OFFICE
CERTIFICATE OF CORRECTION

Patent No. 3,676,445　　　　　　　　　Dated July 11, 1972

Inventor(s) Harry Louis Yale; Ramesh Petigara

It is certified that error appears in the above-identified patent and that said Letters Patent are hereby corrected as shown below:

Column 23, example no. 33:

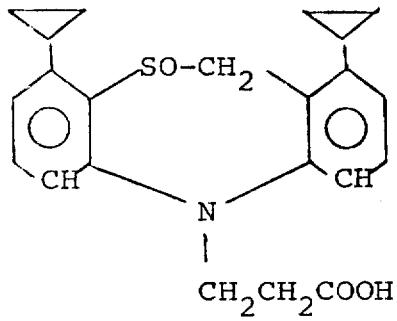　　　should read　　　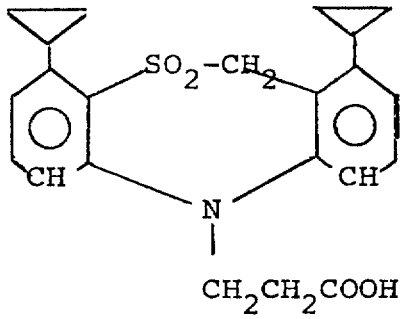

Claim 1 after the structures delete I and II.

Signed and sealed this 23rd day of January 1973.

(SEAL)
Attest:

EDWARD M. FLETCHER, JR.　　　　　　　ROBERT GOTTSCHALK
Attesting Officer　　　　　　　　　　Commissioner of Patents